US010131792B2

(12) United States Patent
Fritzen et al.

(10) Patent No.: US 10,131,792 B2
(45) Date of Patent: Nov. 20, 2018

(54) METHOD FOR TREATING THE SURFACE OF PARTICLES, THE THUS OBTAINED PARTICLES AND USE THEREOF

(71) Applicant: Huntsman P&A Germany GmbH, Duisburg (DE)

(72) Inventors: Petra Fritzen, Moers (DE); Bernd Rohe, Moers (DE); Jörg Hocken, Meerbusch (DE)

(73) Assignee: Huntsman P&A Germany GmbH, Duisburg (DE)

( * ) Notice: Subject to any disclaimer, the term of this patent is extended or adjusted under 35 U.S.C. 154(b) by 0 days.

(21) Appl. No.: 15/122,655

(22) PCT Filed: Mar. 13, 2015

(86) PCT No.: PCT/DE2015/100105
§ 371 (c)(1),
(2) Date: Aug. 31, 2016

(87) PCT Pub. No.: WO2015/135536
PCT Pub. Date: Sep. 17, 2015

(65) Prior Publication Data
US 2017/0066924 A1 Mar. 9, 2017

(30) Foreign Application Priority Data
Mar. 14, 2014 (DE) .................... 10 2014 103 553

(51) Int. Cl.
*C09C 3/12* (2006.01)
*C08K 9/04* (2006.01)
*C08K 5/42* (2006.01)
*C08J 3/22* (2006.01)
*C08K 5/10* (2006.01)
*C09C 1/36* (2006.01)
*C09C 1/02* (2006.01)
*C09C 1/04* (2006.01)
*C09C 1/06* (2006.01)
C08K 3/22 (2006.01)
C08K 3/30 (2006.01)

(52) U.S. Cl.
CPC ............... *C09C 3/12* (2013.01); *C08J 3/226* (2013.01); *C08K 5/10* (2013.01); *C08K 5/42* (2013.01); *C08K 9/04* (2013.01); *C09C 1/027* (2013.01); *C09C 1/04* (2013.01); *C09C 1/06* (2013.01); *C09C 1/3684* (2013.01); *C01P 2006/20* (2013.01); *C08K 2003/2241* (2013.01); *C08K 2003/3036* (2013.01); *C08K 2003/3045* (2013.01)

(58) Field of Classification Search
CPC .... C09C 3/10; C09C 3/12; C09C 1/06; C09C 1/027; C09C 1/3684; C08K 9/06; C08J 3/226
USPC .................................................. 428/403–405
See application file for complete search history.

(56) References Cited

U.S. PATENT DOCUMENTS

| 3,649,321 | A | * | 3/1972 | Durrant ................ C09C 1/3692 106/443 |
| 4,544,415 | A | | 10/1985 | Franz et al. |
| 4,886,551 | A | | 12/1989 | Fink et al. |
| 5,281,478 | A | | 1/1994 | Hoehner et al. |
| 5,387,467 | A | | 2/1995 | Hoehner et al. |
| 7,619,035 | B2 | * | 11/2009 | Henning ................ C08G 77/06 524/838 |
| 8,304,077 | B2 | | 11/2012 | Bubat et al. |
| 9,783,656 | B2 | * | 10/2017 | Lehmann ................. C08K 9/06 |
| 2009/0081142 | A1 | * | 3/2009 | Omura ..................... A61K 8/06 424/60 |
| 2011/0160389 | A1 | | 6/2011 | Bubat et al. |
| 2012/0027704 | A1 | * | 2/2012 | Henning ................ A61K 8/892 424/59 |

FOREIGN PATENT DOCUMENTS

| DE | 4140793 C1 | 3/1993 |
| DE | 10 2008 031901 A1 | 1/2010 |
| EP | 0 141 174 A1 | 5/1985 |
| EP | 0 265 807 A2 | 5/1988 |
| EP | 0546406 A2 | 6/1993 |
| EP | 0546407 A2 | 6/1993 |
| GB | 1288581 A | 9/1972 |
| GB | 1 348 372 A | 3/1974 |
| HU | 216 858 B | 9/1999 |
| WO | 2015/091041 A1 | 6/2015 |

OTHER PUBLICATIONS

"Teratogenic Phthalate Esters and Metabolites Activate the Nuclear Receptors PPARs and Induce Differentiation of F9 Cells" authored by Lampen et al. And published in Toxicology and Applied Pharmacology (2003) 188, 14-23.*
International Preliminary Report on Patentability, PCT/DE2015/100105, dated Sep. 14, 2016.
English Abstract of HU216858.
English Abstract of WO2015091041A1.
English Abstract of EP0546407A2.
English Abstract of EP0546406A2.

* cited by examiner

*Primary Examiner* — Marc S Zimmer
(74) *Attorney, Agent, or Firm* — Cahn & Samuels, LLP

(57) ABSTRACT

A method for producing surface-treated particles includes surface treatment of titanium dioxide, barium sulfate, zinc sulfide or lithopone particles, and to mixtures of the particles with alkoxylated siloxanes and phthalate-free plasticizers for improving dispersion in plastics.

15 Claims, 2 Drawing Sheets

METHOD FOR TREATING THE SURFACE OF PARTICLES, THE THUS OBTAINED PARTICLES AND USE THEREOF

This U.S. patent application is a national stage application of PCT/DE2015/100105 filed on 13 Mar. 2015 and claims priority of German patent document DE 10 2014 103 553.4 filed on 14 Mar. 2014, the entireties of which are incorporated herein by reference.

BACKGROUND OF THE INVENTION

The present invention relates to surface-treated particles, a method for producing surface-treated particles, and use thereof, in particular the surface treatment of titanium dioxide, barium sulphate, zinc sulphide or lithopone particles, and mixtures of these particles with specific alkoxylated siloxanes and phthalate-free plasticisers for improving dispersion in plastics.

Plastics which are formulated so as to produce corresponding polymer compositions are divided into the main groups of thermoplastics and thermosets.

Here, polymers that have a flow transition range above the working temperature are referred to as thermoplastics. Thermoplastics are linear or branched polymers which in principle are flowable above the glass transition temperature (Tg) in the case of amorphous thermoplastics and above the melting point (Tm) in the case of (partly) crystalline thermoplastics. In the softened state they can be processed by pressing, extrusion, injection moulding, or other shaping methods to form moulded articles. The chain movability is so large here that the polymer molecules slide easily over one another and the material reaches the molten state (flow range, polymer melt). Thermoplastics additionally also include thermoplastically workable plastics having pronounced entropy-elastic properties, or what are known as thermoplastic elastomers. Thermoplastics also include all plastics consisting of linear or thermolabile cross-linked polymer molecules, for example polyolefins, vinyl polymers, polyesters, polyacetals, polycarbonates, sometimes also polyurethanes and ionomers, but also TPEs (thermoplastic elastomers (RÖMMP ONLINE, version 3.7, Carlowitz and Wierer, Kunstoffe (Merkblätter) (Plastics (Datasheets)), chapter 1, Thermoplaste (Thermoplastics), Berlin: Springer publishers (1987), Domininghaus, page 95 ff).

Thermosets are plastics which are produced by irreversible and close crosslinking from oligomers (technical term: prepolymers), and more rarely from monomers or polymers, via covalent bonds. The term "thermoset" is used here both for the raw materials prior to the cross-linking (see reaction resins) and as a collective term for the cured resins, which are usually completely amorphous. Thermosets are energy-elastic at low temperatures, and even at high temperatures they cannot flow in a viscous manner, but instead behave elastically with very limited deformability. Thermosets include, inter alia, the technically important substance groups constituted by diallylphthalate resins (DAPs), epoxy resins (EPs), urea formaldehyde resins (UFs), melamine formaldehyde resins (MFs), melamine phenol formaldehyde resins (MPFs), phenol formaldehyde resins, and unsaturated polyester resins (UPES) (RÖMMP ONLINE, version 3.7, Becker, G. W.; Braun, D.; Woebecken, W., Kunstoff-Handbuch (Plastics Handbook), volume 10: Duroplaste (Thermosets), $2^{nd}$ edition; Hanser: Munich, (1988); Elias (6.) 1, 7, 476 ff).

The properties of plastics of this type can be improved by additives. By way of example, plasticisers can be added as additives in order to make the plastics softer, more flexible, more pliable and more elastic for use or for further processing. Plasticisers can be esters of low volatility, fatty oils, or soft resins. Pigments can also be added to the plastics, which pigments are constructed from organic or inorganic constituents. For improved compatibility in particular of the inorganic particles, these can be surface-modified.

Surface-modified particles of this type can consist for example of an inorganic oxide, which is provided with a further inorganic coating as appropriate. Silicon dioxide and aluminium oxide can be used as an inorganic coating, for example of a titanium dioxide pigment. In addition, the inorganically coated pigment can comprise an organic coating in order to influence the hydrophobicity. Organic coating means known from the prior art are, inter alia, PDMS (polydimethylsiloxane) or polyalcohols, such as TMP, or substituted siloxanes, such as alkyl ester polydimethylsiloxane, or reactive coupling agents, such as silanes, zirconates or titanates, or organic compounds containing phosphorus, or stearic acids, Ca stearate, Zn stearate, and Mg stearate. Gilbert thus describes (Gilbert, Varshney, van Soom und Schiller, "Plate-out in PVC Extrusion—I. Analysis of-plate-out", Journal of Vinyl and Additive Technology, (14) 1, 2008, 3-9) the use of Ca stearate or other soaps or the corresponding carboxylic acids, such as stearic acid, in order to realise a surface treatment of titanium dioxide or barium sulphate or mixtures thereof. These methods may result in undesirable side-effects, since products of this type often either cannot be easily used in large-scale pigment production processes or also lead to what is known as plate-out in the production of highly filled masterbatches, i.e. concentrates of the pigments in a thermoplastic matrix. This is understood to mean the build-up of the thermoplastic pigment mixture on the screw or the interior of the housing of the extruder screw. This results in extensive cleaning, particularly with colour changes. In addition, layers deposited in this way can detach at any time and lead to the formation of specks in the masterbatch and later also in the end application, i.e. for example can lead to specks in thin-layer films.

The use of silicone oils of different chain length/viscosity which are sprayed on either as the pigment is ground or which can be fed as emulsion into a pigment slurry is also known from GB 1 288 581. Pigments with silicone oil surface treatment have good hydrophobicity and, on account of their low surface energy, are generally known for the fact that they can be easily introduced into a low-energy plastics environment. Pigments treated in this way have various disadvantages:

Silicone oil-treated particles have a high dust value. Although, for example, titanium dioxide with a relatively high density of 3.9 g/cm$^3$ should not necessarily tend toward this, the high dust value after silicone oil treatment is known from U.S. Pat. No. 3,649,321. The dust value is very problematic with regard to the further processing and may even be relevant to safety.

A low bulk density of the silicone oil-treated pigments leads to problems with regard to the packaging of the pigment in sacks, big bags, or silos. A high amount of air requires filling with a lower mass per packaging unit. If the sack cannot be stacked flat on a pallet, the strapping effort or the effort involved in film-wrapping the pallets increases. Automatic packaging with air conveyance, which is considered to be a high-performance standard, encounters this problem especially.

Silicone oils as surface treatment can lead to further problems in the production of commodities, for example the unsuitability of films for overpainting, printing and/or welding, and in particular a delamination of layers and functional loss can be observed in multi-layer films (Plastics Additives: Advanced Industrial Analysis, 2006, Jan C. J. Bart, pages 419-420; IOC Press, Netherlands, ISBN 1-58603-533-9; Trouble Shouting Guide Brochure—Siegwerk, March 2013).

It is known from DE 41 40 793, and EP 0 546 407, EP 0 546 406 that silicone oils or silane-based structures such as methacryloxypropyltrimethoxysilane are suitable for coating oxidic surfaces as well in order to thus enable higher compatibility with the surrounding organic medium via a hydrophobic or functionalisation of the surface and a reduction of the viscosity, and therefore a greater efficiency of the used pigments. Silanes are sensitive to hydrolysis and generally require an increased temperature of approximately 80° C. in order to activate the silyl or functionality at the pigment or filler surface and form a polymer structure on the surface. Many processes in pigment production are aqueous slurry processes, or the pigments such as titanium dioxide produced by precipitation reactions in water, such that there is a need to be able to introduce surface treatment agents in aqueous form, for example emulsified, into the process in simple form. On the other hand, in processes in which the surface of dry pigments or fillers is treated, there is a need for there to be no automatic possibility in these processes to increase the temperature significantly above the ambient temperature, or for there to be no resultant cost increase, although this is a process disadvantage for the binding of silanes because temperatures above 80° C. are necessary for this purpose for splitting-off the alcohol. There was thus a need to provide a surface treatment for dry grinding or mixing processes which, as appropriate, also guarantees surface modification without a rise in temperature. Furthermore, it would be advantageous to use a method in which no alcohol is split off in order to avoid costly explosion protection for the grinding and/or drying procedure.

The dispersion of hydrophilic inorganic pigments, such as titanium dioxide, barium sulphate, zinc sulphide and/or lithopone, which comprise a multiplicity of hydroxyl groups (HO—) and/or thiol groups (HS—) at the surface poses a problem. Either a high outlay is to be expected on account of long dispersion times, or there is an inadequate dispersion with unacceptable defect characteristics of the end product. Defect characteristics of this type can be: the formation of specks in plastics films which are not only aesthetic in nature, but can lead to the formation of holes and therefore leaks in the packaging, specks in the injected plastics part can lead to mechanical defects, i.e. result in a much lower tensile strength or impact strength and therefore lead to a high rejection rate in the injection-moulding production process or even to failure of safety-relevant components made of plastic in the automotive or electronics industry.

As already mentioned before, besides pigments, further additives such as plasticisers can also be added to plastics. Plasticisers are substances which are added to thermoplastic polymers in order to make these softer, more flexible and/or more elastic. By way of example, soft PVC in contrast to hard PVC contains greater quantities of plasticisers and can be easily processed by calendering or extrusion. By varying the plasticiser proportion, the flexibility of the plastic, for example of a PVC film, can be purposefully adjusted. Films of this type are permeable to oxygen and carbon dioxide and have been used for the packaging of food. However, phthalate plasticisers used for this purpose have been found to have a partly teratogenic and fertility-destroying effect. In order to be able to use plasticisers in packagings that have contact with food, plasticisers with reduced migration tendency are necessary. Such plasticisers can then be used for food packagings as well as for medical equipment and children's toys.

Indispensable requirements of pigments for use in polymers are good flowability and low dusting, good dispersibility and fineness (for example subsequent use in very thin films), quick wettability (to increase throughput in paste production), high possible degrees of filling (to reduce the storage volume of the stock pastes) and absolute flocculation and settling stability over the storage period. In addition, approval for potential indirect contact with food and/or medical compatibility is of course required. Surface-treated particles which are to be used in plastics packaging suitable for food are subject to European standard EC 10/2011 and/or the standards of the American FDA.

A wide variety of requirements are placed on pigments. On the one hand, they must be optimised in respect of the end use for processing in plastics, and on the other hand the incorporation process in a plasticiser (for example with a dissolver) and subsequent storage thereof as a paste or liquid as masterbatch requires a pigment which must be optimised for paints and dyes. Both requirements can be taken into account within the scope of an optimised organic coating.

However, particles which meet both the above-mentioned requirements and also additionally avoid the previously mentioned disadvantages are known in the prior art.

The object of the invention is therefore to provide particles for plastics products which meet the above-mentioned requirements, particularly in respect of the approval for food packaging, and in addition eliminate the disadvantages known from the prior art.

SUMMARY OF THE INVENTION

It has surprisingly been found that the particles according to the invention having the features according to the main claim achieve the object.

Such particles, which have been post-treated with plasticisers and thus have a coating of plasticisers, are not known in the prior art. The invention is therefore directed to particles from $TiO_2$, $BaSO_4$, ZnS or lithopone primary particles with a coating comprising at least one polyether siloxane of formula (I)

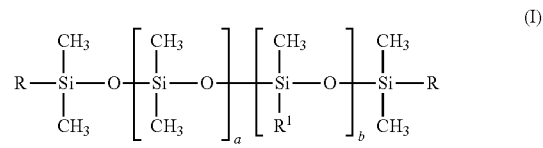

in which
R is $R^1$, methyl or hydroxy,
$R^1$ is a polyether group of formula (II):

in which
Z is equal to a branched or unbranched alkylene group having 2 to 4 carbon atoms, preferably 3 carbon atoms,
m is 2 to 4, preferably 3,
n is 1 to 3, preferably 1 or 2, particularly preferably 1,
o is 0 or 1, preferably 0, ($EO_x$, $PO_y$, $BO_z$) is an oxyalkylene group, containing oxyethylene (EO), oxypropylene (PO) and/or oxybutylene (BO) units, wherein x, y and z are each ≥0 and at least one of x, y and z is unequal to 0, $R^3$ is hydrogen when n=1, or is a hydrocarbon group having 1 to 4 carbon atoms, and with the provision that in $R^1$ the sum of carbon and oxygen atoms is at least 70, a is 20 to 200, preferably from 30, from 40, from 50, from 60 to 170, to 160, to 150, to 140, to 130, to 120, to 110, and particularly preferably is 70 to 100, b is 1 to 50, preferably from 2, from 3, from 4 to 30, to 25, to 20, and particularly preferably is 5 to 15, with the provision that when none of the groups R is equal to $R^1$, b is at least 3, and comprising at least one phthalate-free plasticiser, wherein the at least one compound of formula (I) is present with a proportion of from 0.01 to 2% by weight, preferably 0.05 to 1% by weight, more preferably 0.1 to 0.8% by weight, even more preferably 0.2 to 0.6% by weight, and particularly preferably 0.3 to 0.5% by weight, and wherein the at least one phthalate-free plasticiser is present with a proportion of from 0.01 to 4.0% by weight, preferably 0.05 to 2.0% by weight, more preferably 0.1 to 1.6% by weight, wherein the values in % by weight relate to the weight of the used dried primary particles.

DETAILED DESCRIPTION OF THE INVENTION

Within the scope of the present invention inclusive of the preferred embodiment, the groups R and $R^1$ in formula (I) and $R^3$ in formula (II) can each have different meanings when a number of groups R, $R^1$ and $R^3$ are present in a polyether siloxane of formula (I). R at one end of the molecule chain for example can have the meaning of methyl, and R at the other end of the molecule chain for example can have the meaning of $R^1$, which in turn can have a different meaning compared with one or more groups $R^1$ in the side chain when b stands for a number from 1 to 50. $R^3$ in the polyether group of formula (II) can also have a different meaning in each group $R^1$ when there are a number of groups $R^1$ in a polyether siloxane of formula (I).

All weight values relate to the weight of the used dried primary particles, wherein drying is understood to mean the heating of the particles to a temperature of up to 250° C. for a period of a few seconds up to eight hours until a constant weight is achieved.

The particles according to the invention are thus produced from $TiO_2$, $BaSO_4$, ZnS or lithopone primary particles which, after drying, are treated with the polysiloxane compound of formula (I) as above, which are described for the first time in DE 102013226800, and the phthalate-free plasticiser, wherein the coating is formed. A coating in the sense of the invention can consist of at least one layer, for example also of two layers, applied to a particle. The layer thickness within a layer can vary. A layer can consist of a number of components distributed regularly or irregularly within the layer, all the components can also be distributed over different layers. The at least one layer can cover the surface of a particle wholly or partially.

The coating according to the invention can preferably comprise a layer which comprises at least one polysiloxane compound of formula (I) and at least one phthalate-free plasticiser, wherein the two components are randomly distributed within the layer. The layer also preferably covers the entire particle surface.

In the polysiloxane compound of formula (I) the oxyalkylene group ($EO_x$, $PO_y$, $BO_z$) can preferably comprise from 0 to 50% by weight, preferably from 5 to 35% by weight, more preferably from 15 to 30% by weight of oxyacetylene groups in relation to the total mass of the group $R^1$. In accordance with the invention, an alkylene group is understood to mean a —$(CH_2)_{2-4}$ group, and an oxyalkylene group is understood to mean an —O—$(CH_2)_{2-4}$ group.

In the presence of oxybutylene groups, the molar proportion of oxybutylene groups in relation to the sum of oxypropylene and oxybutylene groups is preferably at most 50%, preferably up to 45, 40, 35, 30, 25, 20, 15, 10, and in particular up to 5%.

The numerical proportion of unmodified siloxane fragments with the index a is preferably up to 20 times greater than the proportion of siloxane fragments with the index b modified with polyether, preferably up to 20 times, up to 19, up to 18, up to 17, up to 16, up to 15, up to 14, up to 13, up to 12, up to 11, up to 10, up to 9, and particularly preferably up to 8 times. The index a is preferably at least 7 times the index b, more preferably at least 8 times, 9 times, 10 times, 11 times, and in particular at least 12 times the index b.

The numerical ratio of index a to index b is preferably equal to 8 to 18, preferably 9 to 15, and particularly preferably 10 to 12.

The index o is preferably equal to zero.

The fragment with the index o is preferably an unbranched group, more preferably an unbranched group having 3 carbon atoms. The fragment with the index o is particularly preferably a glyceryl group, particularly preferably an n-glyceryl group, which terminally carries the group —O—Z.

The group Z is preferably a linear propylene group.

The group $R^3$ is preferably a hydrogen.

Particles according to the invention which are particularly preferred are those having a coating comprising at least one compound of formula (I), wherein in formula (I):

$R^1$ is a polyether group of formula (II), in which

Z is equal to an unbranched alkylene group having 2 to 4 carbon atoms, preferably 2 or 3 carbon atoms, o is 0, x is 0 to 20, preferably 3 to 15, particularly preferably 4 to 10, y is 5 to 100, preferably 8 to 50, particularly preferably 10 to 30, z is 0 to 20, and R and $R^3$ and the other definitions are as specified in claim 1.

The numerical ratio of index a to index b is preferably equal to 8 to 18, preferably 9 to 15, and particularly preferably 10 to 12.

The index x is preferably less than or equal to 1.2, preferably less than 1.1, more preferably less than 1, less than 0.9, less than 0.8, less than 0.7, less than 0.6, less than 0.5, less than 0.4, less than 0.3, and in particular less than 0.2.

The index x is preferably between 0.05 and 1.2 times the sum of the indices (y+z), preferably between 0.07 and 0.8 times, in particular between 0.1 and 0.5 times.

The index z is also preferably less than or equal to the index y, preferably less than or equal to half, a third, a quarter, a fifth, a sixth, a seventh, an eighth, a ninth, and in particular less than or equal to a tenth of the index y.

An oxybutylene group is preferably linear, i.e. —(CH$_2$)$_4$—O— and/or branched, i.e. —CH(CH$_2$CH$_3$)CH$_2$—O—.

Particles according to the invention which are particularly preferred are those having a coating comprising at least one compound of formula (I) in which, in formula (I):

R is equal to methyl,
a is 80 to 95,
b is 5 to 8,
R$^3$ is hydrogen,
x is 3 to 5,
y is 10 to 25,
z is 0.

The particles according to the invention preferably consist of titanium dioxide.

Polyether siloxanes within the sense of the invention are compounds of formula (I).

The siloxane fragments of formulas (I) and (II), and also the siloxane fragments (EO$_x$, PO$_y$, BO$_z$) and R$^1$ can be randomly structured. Here, random distributions are constructed in blocks with any number of blocks and are based on any sequence or a randomised distribution; they can also be constructed alternately, or can form a gradient via the chain, and in particular they can also all form mixed forms, in which groups of different distributions can follow one another as appropriate. Special embodiments can cause the random distributions to be subject to limitations as a result of the embodiment. The random distribution does not change for any regions not affected by the limitation.

The particles surface-treated in accordance with the invention comprise phthalate-free plasticiser. Phthalate-free means that the plasticisers according to the invention do not comprise any 1,2-phthalate acid esters.

Plasticisers which are used for the treatment of the primary particles from TiO$_2$, BaSO$_4$, ZnS or lithopone for production of the particles according to the invention therefore comprise phthalate-free plasticisers from the group comprising esters of aliphatic hydrocarbons having 6 to 21 carbon atoms with at least one acid group selected from a carboxyl group —CO$_2$H, sulfonyl group —SO$_3$H, or sulfinyl group —SO$_2$H, with a monovalent or polyvalent aliphatic alcohol having preferably 6 to 20 carbon atoms or a monovalent or bivalent aromatic alcohol or mixtures thereof, and esters of aromatic 1,4-(para)dicarboxylic acids, preferably 1,4-benzenedicarboxylic acid, or aromatic tricarboxylic acids with a monovalent or polyvalent aliphatic alcohol having preferably 6 to 20 carbon atoms or mixtures thereof.

Examples of phthalate-free plasticisers include:
  esters of aliphatic hydrocarbons having 6 to 21 carbon atoms with at least one acid group selected from a carboxyl group, such as esters of polyvalent aliphatic carboxylic acids, for example alkylcarboxylic acid alkyl esters or alkyldicarboxylic acid dialkyl esters, polyethylene glycol dialkyl carboxylic acid esters, in particular esters of polyvalent cycloaliphatic carboxylic acids, such as esters of cyclohexane dicarboxylic acid, in particular esters of 1,2-cyclohexane dicarboxylic acid; with a monovalent or polyvalent aliphatic alcohol or mixtures thereof;
  esters of aliphatic hydrocarbons having 6 to 21 carbon atoms with at least one acid group, selected from a sulfonyl group —SO$_3$H, or sulfinyl group —SO$_2$H, with a monovalent or polyvalent aliphatic or aromatic alcohol or mixtures thereof; for example alkanesulfonic acid alkyl esters or alkanedisulfonic acid dialkyl esters, polyethylene glycol dialkyl sulfonic acid esters, alkanesulfonic acid aryl esters, or alkanedisulfonic acid diaryl esters;
  esters of aromatic 1,4-dicarboxylic acids or aromatic tricarboxylic acids with a monovalent or polyvalent aliphatic alcohol or mixtures thereof.

Aliphatic hydrocarbon having 6 to 21 carbon atoms with at least one acid group includes, in the sense of the invention, straight-chain, branched, or cyclic aliphatic hydrocarbons, which can also have one or more substituents.

Aromatic hydrocarbon such as aromatic 1,4-dicarboxylic acids or aromatic tricarboxylic acids include, in the sense of the invention, aromatic C$_6$ to C$_{14}$ hydrocarbons, which can also have one or more substituents.

A monovalent or polyvalent aliphatic alcohol are understood in accordance with the invention to mean alcohols having 6 to 20 carbon atoms with one or more hydroxyl groups, which, as mentioned above, can be straight-chain, branched, or cyclic aliphatic hydrocarbons, which can also contain one or more functional groups as mentioned above. These are also understood to include oligomers of glycols, such as diethylene glycol, triethylene glycol, tetraethylene glycol, etc.

1,2-cyclohexanedicarboxylic acid diisononyl ester (Hexamoll Dinch—BASF, Elatur CH—Evonik), alkanesulfonic acid phenyl ester, alkanesulfonic acid diphenyl ester (Mesamoll—Lanxess), bis(2-ethylhexyl-)1,4-benzene dicarboxylate (Oxosoft GPO—Oxea), triethylene glycol bis(2-ethylhexanoate) (Oxosoft 3G8—Oxea), and trioctyl trimellitate (Oxea) can be used with preference in accordance with the invention as phthalate-free plasticiser.

An advantage of particles surface-treated in accordance with the invention is the improved dust value, which is significantly reduced compared to pigments of the prior art which have been treated with silicone oil. Emissions of dust are thus reduced during the further processing. Potential dust explosions are also prevented.

A further advantage of the particles according to the invention is that they are not subject to any limitation with respect to their use in food packaging in accordance with current regulations, such as European standard EC 10/2011 and/or the American FDA standards.

A further advantage of the particles according to the invention and compositions according to the invention is that the pressure filter values are reduced compared to the prior art. This increases the service lives of the processing devices, in particular the extruders, and reduces the cleaning cycles thereof.

A good dispersion is also advantageous in order to avoid fibre breakages and/or specks in the products.

The high temperature resistance of the particles according to the invention and of the compositions according to the invention is also advantageous.

A further advantage of the particles according to the invention is their powder flowability, which is evident particularly when unloading big bags and silo vehicles or with the direct use of the particles when added in a metered manner into the processing unit (for example extruder or kneader) via pneumatic systems and pounder screws.

A further advantage of the particles according to the invention is that compositions can be formulated in many ways. This is manifested in the fact that the compositions can be formulated on the basis of thermoplastics, thermoset, and plasticisers. This signifies the advantage for the further-processing industry, such as paste manufacturers, compounders, and masterbatchers, that the particles according to the invention can be used without further adaptations. This results in a financial advantage and formulation flexibility.

A further advantage of the particles according to the invention is the low agglomeration tendency on account of the coating according to the method according to the invention. All crystal forms of titanium dioxide, barium sulphate, and zinc sulphide are suitable as primary particles for production of the particles according to the invention.

In the sense of the invention, primary particles are understood to mean particles which occur as end products of their respective production processes and are thus present as particles from $TiO_2$, $BaSO_4$, ZnS or lithopone constructed from crystallites and/or amorphous units. The primary particles, for example from $TiO_2$, can be subjected to an inorganic pre-treatment. These particles can then be treated with the polysiloxanes of formula (I) and plasticisers, and can then be ground. During the grinding process and subsequently thereafter, the polysiloxanes of formula (I) and plasticisers migrate on the surface of the particles so that the entire particle surface is coated therewith.

In the case of titanium dioxide, this is present in polymorphous forms for example, such as rutile, anatase or brookite. The titanium dioxide can be produced by different methods known in the prior art. In accordance with the invention, various hydrated forms of titanium dioxide can also be used. Titanium dioxide under the name E171 in accordance with food additive regulation 231/2012/EC is approved as white pigment, and also under the name CI 77891 in accordance with cosmetics regulation EC 1223/2009. Barium sulphate is used in accordance with the invention under the names heavy spar, barite, fixed white and blanc fixe. The different crystal forms of zinc sulphide, i.e. alpha zinc sulphide, known in nature as wurtzite, and/or beta zinc sulphide, known in nature as zinc blende and sphalerite, are used in accordance with the invention.

If desired, mixtures of the specified pigments can also be surface-treated in accordance with the invention. The mixtures can be produced by mixing the pigments produced previously in pure form or by co-precipitation, in particular in the form of lithopone. These mixtures constitute primary particles in the sense of the invention.

In a preferred embodiment, unmodified or inorganically modified titanium dioxide is used. In order to treat the surface, the $TiO_2$ main body is ground and then covered with one or more layers of inorganic substances. Here, the substance to be precipitated is added firstly in dissolved form. For this purpose, it is necessary to set a pH value in the suspension at which the inorganic substance does not precipitate as a solid. The inorganic substance is then precipitated out from this suspension by changing the pH value toward the neutral point. The oxides or hydroxides of aluminium, silicon, zirconium and also titanium are used in this treatment (J. Winkler, Titandioxid (Titanium dioxide), (2003), chapter 3.4, pages 38-41, ISBN 3-87870-738-X). After this treatment the surface of the titanium dioxide particles is accordingly modified so that the particles consist of titanium dioxide to an extent of at most 99% by weight, preferably at most 95% by weight, particularly preferably at most 85% by weight, in relation to the total mass of the particle. The particles more preferably consist of titanium dioxide to an extent of at least 80% by weight, preferably at least 85% by weight, particularly preferably at least 90% by weight, in relation to the total mass of the particles. The titanium dioxide particles inorganically treated in this way are primary particles in the sense of the invention.

Preferred particles are titanium dioxide particles, optionally inorganically modified.

The packing density of the particles is preferably increased by the surface treatment according to the invention and is then evident in a reduced bulk density and also an improved flowability.

The particles surface-treated in accordance with the invention preferably have a reduced dust value. The dust value can be determined in what is known as a dust chamber. Here, a defined quantity of particles, for example 100 g, is placed in free fall in the atmosphere of the surroundings in a downpipe. The particles settle in the atmosphere at the bottom of a cylinder, and a portion thereof remains as dust in the gas phase of the fall volume. The volume above the sediment is suctioned up, and in so doing the contained dust is filtered off. By weighing the filter, the quantity of dust is determined. The particles according to the invention preferably have a dust mass of less than 30 mg/100 g of surface-treated particles, preferably of less than 10 mg/100 g of surface-treated particles.

The powder flowability can be determined using, for example, an RST-RX ring shear tester (D. Schulze, Pulver and Schüttgüter (Powder and Bulk Materials), Springer publishers, 2006, chapter 3.1.4, page 42). The bulk material sample is for this purpose loaded from above by a measurement cell with a force (normal force) of 3.5 kPa. The shear cell rotates slowly (ω) during the measurement. The bulk material sample is subject to shear deformation. The required force ($F_1$ and $F_2$) is measured. The flowability $ff_c$ of the bulk material is determined from the ratio of consolidation stress $\sigma_1$ to bulk material strength $\sigma_c$. The greater is the flowability $ff_c$, the better the bulk material flows.

The particles according to the invention preferably have a powder flowability of more than 2.1. The powder flowability can be determined in accordance with ASTM D6773-08.

The dispersibility of the particles surface-treated In accordance with the invention can be determined and evaluated on the basis of the rise in pressure (pressure filter value) before a filter (of which the mesh size is to be specified) resulting during the extrusion of a polymer melt via a screen pack. The test can be carried out for example in accordance with DIN EN 13900-5:2005.

The compositions according to the invention in the form of masterbatches preferably have a pressure filter value (14 μm) of up to 10 bar*cm$^2$/g, more preferably of up to 5 bar*cm$^2$/g, and in particular of up to 3 bar*cm$^2$/g. The pressure filter values can be determined in this case as described in the examples.

A further possibility for assessing the dispersibility lies in the determination and evaluation of the number of conglomerates in a flat film. Here, agglomerates are visible as specks. The number of specks should be minimal.

A further possibility for assessing the dispersibility lies in determining the fineness of the particles according to the invention for example in a white paste under defined dispersion conditions. For this purpose, a grindometer, for example from Hegman, is suitable for example. The determination can be carried out for example in accordance with DIN EN 21524 (corresponding to ISO 1525). The particles according to the invention should be as fine as possible, preferably smaller than 20 μm, particularly preferably smaller than 18 μm, and in particular smaller than 16 μm.

A further subject of the invention is the use of the particles according to the invention for the production of polymer compositions.

The particles according to the invention are preferably used for the production of compositions, in particular polymer compositions, containing the particles according to the invention for the processing of plastic moulded articles or films. A further subject of the invention is thus constituted by compositions containing at least one polymer and at least particles according to the invention.

The compositions according to the invention contain at least one polymer in addition to the particles according to the invention.

Preferred polymers of the compositions according to the invention are thermosets or thermoplastics. By way of example, unsaturated polyester resins (UPs), phenol resins, melamine resins, formaldehyde moulding compounds, vinyl ester resins, diallyl phthalate resins, silicone resins or urea resins are suitable as thermosets. By way of example, polyethylene, polypropylene, polyester, polyamide, PET, polystyrene, copolymers and blends thereof, polycarbonate, PMMA, or polyvinyl chloride are suitable as thermoplastic materials.

The thermoplastic-containing compositions according to the invention are preferably processed to form masterbatches and/or plastic films.

The compositions are preferably processed to form masterbatches, plastic moulded articles, and/or plastic films.

The thermoset-containing compositions according to the invention are more preferably processed to form plastic moulded articles.

The particles according to the invention can, in principle, be produced in accordance with methods from the prior art, but preferably are produced by the method described hereinafter.

A further subject of the invention is thus a method for the surface treatment of $TiO_2$, $BaSO_4$, ZnS or lithopone primary particles, in which the primary particles are brought into contact, simultaneously or in succession, with at least one polyether siloxane of formula (I)

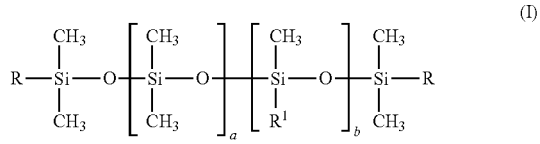

in which
R is $R^1$, methyl or hydroxy;
$R^1$ is a polyether group of formula (II):

in which
Z is equal to a branched or unbranched alkylene group having 2 to 4 carbon atoms, preferably 3 carbon atoms,
m is 2 to 4, preferably 3,
n is 1 to 3, preferably 1 or 2, particularly preferably 1,
o is 0 or 1, preferably 0,
($EO_x$, $PO_y$, $BO_z$) is an oxyalkykene group, containing oxyethylene (EO), oxypropylene (PO) and/or oxybutylene (BO) units, wherein x, y and z are each ≥0 and at least one of x, y and z is unequal to 0,
$R^3$ is hydrogen when n=1, or is a hydrocarbon group having 1 to 4 carbon atoms,
and with the provision that in $R^1$ the sum of carbon and oxygen atoms is at least 70,
a is 20 to 200, preferably from 30, from 40, from 50, from 60 to 170, to 160, to 150, to 140, to 130, to 120, to 110, and particularly preferably is 70 to 100,
b is 1 to 50, preferably from 2, from 3, from 4 to 30, to 25, to 20, and particularly preferably is 5 to 15, with the provision that when none of the groups R is equal to $R^1$, b is at least 3,
and with at least one phthalate-free plasticiser or mixtures thereof,
wherein the at least one compound of formula (I) is present with a proportion of from 0.01 to 2% by weight, preferably 0.05 to 1% by weight, more preferably 0.1 to 0.8% by weight, even more preferably 0.2 to 0.6% by weight, and particularly preferably 0.3 to 0.5% by weight, and
wherein the at least one phthalate-free plasticiser is present with a proportion of from 0.01 to 4.0% by weight, preferably 0.05 to 2.0% by weight, more preferably 0.1 to 1.6% by weight,
wherein the values in % by weight relate to the weight of the used dried primary particles.

Compounds of formula (I) can thus be used individually or in mixtures of a number of compounds thereof with a phthalate-free plasticiser individually or in mixtures of a number thereof for the surface treatment of $TiO_2$, $BaSO_4$, ZnS or lithopone primary particles. Preferred embodiments of the surface-treatment agent of formula (I) and of the phthalate-free plasticiser are already specified above and apply likewise to the method for the surface-treatment of $TiO_2$, $BaSO_4$, ZnS or lithopone particles.

The surface treatment of the primary particles can be performed dry or wet; in the case of the wet variant this is preferably carried out in emulsion. If the surface treatment is carried out with an emulsified polyether siloxane of formula (I), this can be performed with addition of emulsifiers.

When preparing the polyether siloxanes of formula (I) as emulsions, oil-in-water emulsions containing 5 to 70% by weight of polyether siloxanes, 1 to 20% by weight of emulsifiers, and 20 to 94% by weight of water are preferred. Methods for producing silicone emulsions are known to a person skilled in the art. The production is usually performed by stirring all constituents and by subsequent homogenisation, where appropriate, using jet dispersers, rotor-stator or rotor-rotor homogenisers, colloid mills, or high-pressure homogenisers. Methods for creating an emulsion are described for example in EP0093310, DE2555048, and EP1132417.

Here, all emulsifiers known to a person skilled in the art for producing polysiloxane emulsions can be used, such as anionic, cationic, amphoteric or non-ionogenic emulsifiers.

Exemplary anionic emulsifiers include, although this list is not exhaustive: alkyl sulphates, in particular having 8 to 22 carbon atoms in the alkyl group, alkyl and alkylaryl ether sulphates having 8 to 22 carbon atoms in the alkyl group and 1 to 40 oxyethylene or oxypropylene units; sulfonates, in particular alkyl sulfonates having 8 to 22 carbon atoms, alkylaryl sulfonates having 8 to 22 carbon atoms, mono- and diesters of sulfosuccinates, salts of carboxylic acids having 8 to 22 carbon atoms in the alkyl, aryl, alkaryl or aryalkyl unit; phosphoric acid mono esters and diesters and salts thereof, in particular alkyl and alkaryl phosphates having 8 to 22 carbon atoms in the organic unit, alkylether and alkaryl ether phosphates having 8 to 22 carbon atoms in the alkyl or alkaryl unit and 1 to 40 oxyethylene units. As is well known in the field of emulsifiers, in the case of anionic emulsifiers the counterions can be alkali metal cations, ammonium or protein-substituted amines, such as those of trimethylamine or triethanolamine. Ammonium, sodium and potassium ions are normally preferred.

Exemplary cationic emulsifiers include, although this list is not exhaustive: salts of primary, secondary and tertiary fatty amines having 8 to 24 carbon atoms with acetic acid, sulphuric acid, hydrogen chloride and phosphoric acids; quaternary alkyl- and alkylphenyl ammonium salts, in particular those that have 6 to 24 carbon atoms, especially the halides, sulphates, phosphates and acetates thereof; alkylpyridinium, alkylimidazolinium, and alkyloxazolinium salts, in particular those with an alkyl chain of up to 18 carbon atoms, especially the halides, sulphates, phosphates and acetates thereof.

The following are potential amphoteric emulsifiers: amino acids with long-chain substituents, such as N-alkyldi (aminoethyl)glycine or N-alkyl-2-aminopropionic acid salts with an acyl radical having 8 to 20 carbon atoms.

Exemplary non-ionogenic emulsifiers include, although this list is not exhaustive: polyoxyethylene condensates of fatty acids or fatty alcohols having 8 to 22 carbon atoms with up to 95% by weight oxyethylene content in relation to the molar mass of the emulsifier; polyoxyethylene derivatives of phenols having 6 to 20 carbon atoms at the aromatic and up to 95 percent oxyethylene content; oxyethylene condensates of fatty acid monoesters of glycerol having 10 to 22 carbon atoms and up to 95 percent oxyethylene; sorbitol esters of fatty acids having 10 to 22 carbon atoms; polyoxyethylene sorbitol esters of fatty acids having 10 to 22 carbon atoms; ethoxylated amides, ethoxylated amines, alkoxylated polysiloxanes, block copolymers of propylene, ethylene oxide and/or other epoxies.

The above-mentioned fat structures usually constitute the lipophilic part of the emulsifiers. A conventional fat group is an alkyl group of natural or synthetic origin. Known unsaturated groups are the oleyl, linoleyl, decenyl, hexadecenyl and dodecenyl groups. Known saturated groups are lauryl, stearyl, myristyl, and palmityl groups. Alkyl groups can be cyclic, linear or branched.

When emulsifying, an emulsifier or a mixture of a number of different emulsifiers can be used, wherein at least one non-ionogenic emulsifier, such as ethoxylated fatty acids, ethoxylated linear or branched fatty alcohols, sorbitol fatty acid esters or ethoxylated sorbitol fatty acid esters, should be contained.

Known compounds, such as polyacrylic acid, polyacrylates, cellulose ethers, such as carboxymethyl cellulose and hydroxyethyl cellulose, natural gums, such as xanthan gum, and polyurethanes, and also preservatives and other conventional additives known to a person skilled in the art can also be added to the emulsions as thickening agents.

In the method according to the invention the particles can be surface-treated in a one-step or two-step method.

The mixing and grinding are performed at the same time in the one-step method.

In the two-step method, the polyether siloxanes of formula (I) and the phthalate-free plasticisers can be admixed to the primary particles in the first step. It is also possible, however, to admix any two of the three components with the third component in succession or at the same time and thus mix said components.

At least one of the polyether siloxanes of formula (I) and at least one phthalate-free plasticiser according to the invention are preferably added in succession or at the same time to the primary particles and mixed therewith.

The polyether siloxanes of formula (I) and the phthalate-free plasticisers according to the invention are particularly preferably added to the primary particles in succession.

A plough blade mixer is preferably used for mixing.

The first step is preferably carried out at room temperature or temperatures up to 60° C.

In the second step, the particles from the first step are ground. Preferred mills include steam jet mills, pin mills, air jet mills, roller mills, or ball tube mills; a steam jet mill is particularly preferred.

The grinding can be performed at normal pressure or at increased pressure up to 20 bar, preferably up to 19 bar, 18 bar, 17 bar, 16 bar, 15 bar, 14 bar, 13 bar, 12 bar, 11 bar, 10 bar, 9 bar, 8 bar, 7 bar, 6 bar, 5 bar, 4 bar, 3 bar, or up to 2 bar.

The particles in the second step of the method according to the invention are preferably ground in a steam jet mill at a pressure of from 8 to 20 bar, preferably 10 to 19 bar, more preferably 12 to 18 bar.

The particles are preferably surface-treated in a one- or two-step method.

Reference is made to patent application DE 102013226800 with regard to the production of the polyether siloxanes used in accordance with the invention, the content of said document being incorporated herein by reference thereto. The polyether siloxanes used in accordance with the invention can be produced accordingly by noble metal-catalysed hydrosilylation of the linear or branched siloxanes of formula (Ia)

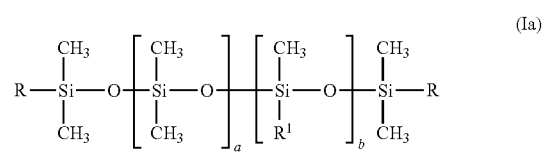

in which: R is $R^1$, methyl or hydroxy, and $R^1$ is hydrogen, with the above-mentioned definitions of the groups and indices, with terminally unsaturated polyethers, as described for example in EP1520870.

The polyethers to be hydrosilylated correspond to formula (IIa)

$$—Y—(O—C_mH_{2m-(n-1)})_o—[O-(EO_x,PO_y,BO_z)—R^3]_n \qquad \text{(IIa)}$$

with the above-definitions and preferences of the groups and indices, wherein the group Y is terminally unsaturated, preferably with a C=C double bond, more preferably allylically unsaturated with respect to the oxygen, in particular an allyl ether.

In a particular embodiment starting alcohols which lead to branched polyethers, which then have two or more oxyalkylene chains, can be used for the representation of these polyethers. Starting alcohols are, for example, trimethylolpropane monoallyl ethers or glycerol monoallyl ethers. Glycerol monoallyl ethers, in particular the terminally allylically substituted glycerol monoallyl ethers, are preferred in accordance with the invention.

The hydrogen siloxanes used in the production of the polyether siloxanes can be produced as described in the prior art, for example in EP1439200. The used unsaturated polyethers can be produced starting from unsaturated starting alcohols by the methods known in the literature for alkaline alkoxylation or with use of DMC catalysts as in the prior art, as described for example in DE102007057145.

The particles according to the invention, the compositions according to the invention containing the particles according to the invention, and the use according to the invention of the particles and compositions thereof, and also the method according to the invention for producing the particles will be described hereinafter by way of example, without intending to limit the invention to these exemplary embodiments. When ranges, general formulas or compound classes are specified hereinafter, these not only include the corresponding ranges or groups or compounds explicitly mentioned, but also all sub-ranges and sub-groups of compounds which can be obtained by removing individual values (ranges) or compounds. If documents are cited within the scope of the present description, the content of said documents will belong fully to the disclosure of the present invention. If values in % are provided hereinafter, these are values in % by weight, unless otherwise specified. In the case of compositions the values in % relate to the total composition, unless otherwise specified. If average values are specified hereinafter, these are a mass average (weight average). If measured values are specified hereinafter, these measured values were obtained at a pressure of 101325 Pa and a temperature of 25° C., unless otherwise specified.

EXAMPLES

Example 1: Surface Treatment of Particles

Figure 1:
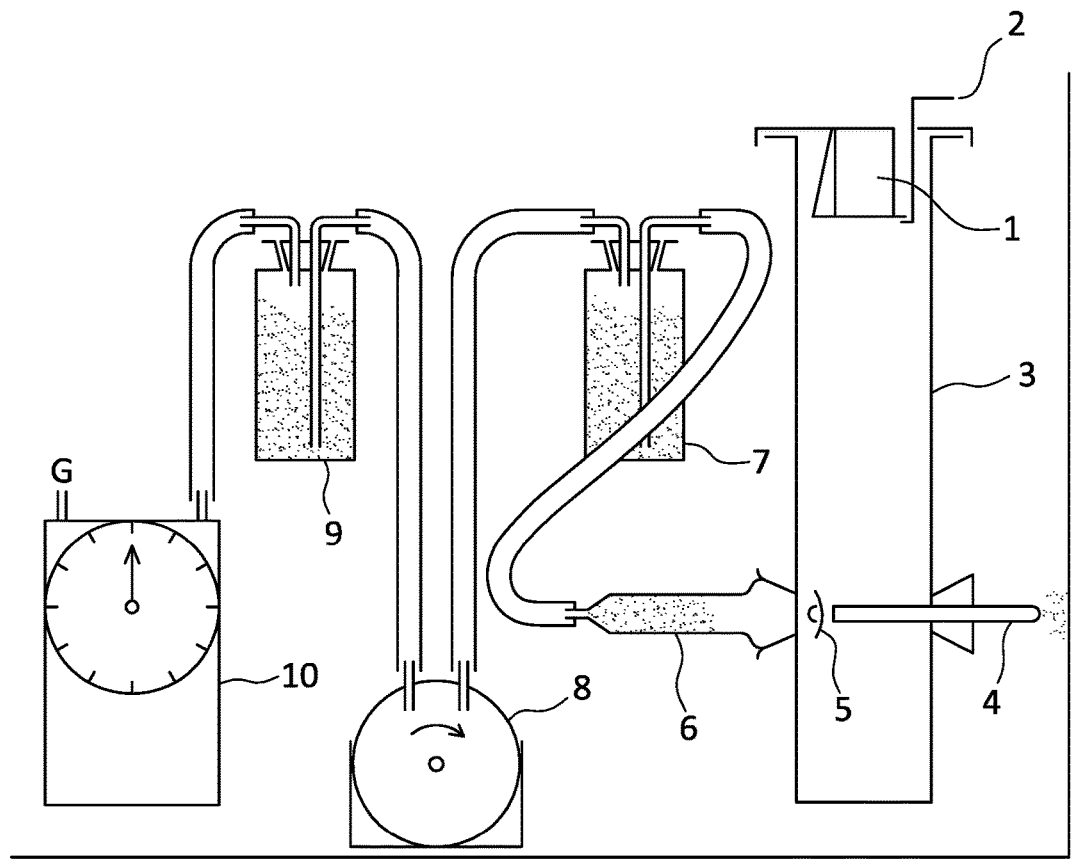
FIG. 1: The figure shows the principle of the dust chamber, the operating principle of which is described in detail in Example 2 in VI. The numbers mean: 1) fall box, 2) unlocking lever, 3) glass cylinder, 4) gate, 5) seal rubber, 6) test tube (filled with quartz wadding), 7)+9) washing flask (filled with quartz wadding), 8) vacuum pump, 10) gas meter, the letter G at the outlet of the gas meter denotes the outlet for the suctioned gas.
Figure 2:
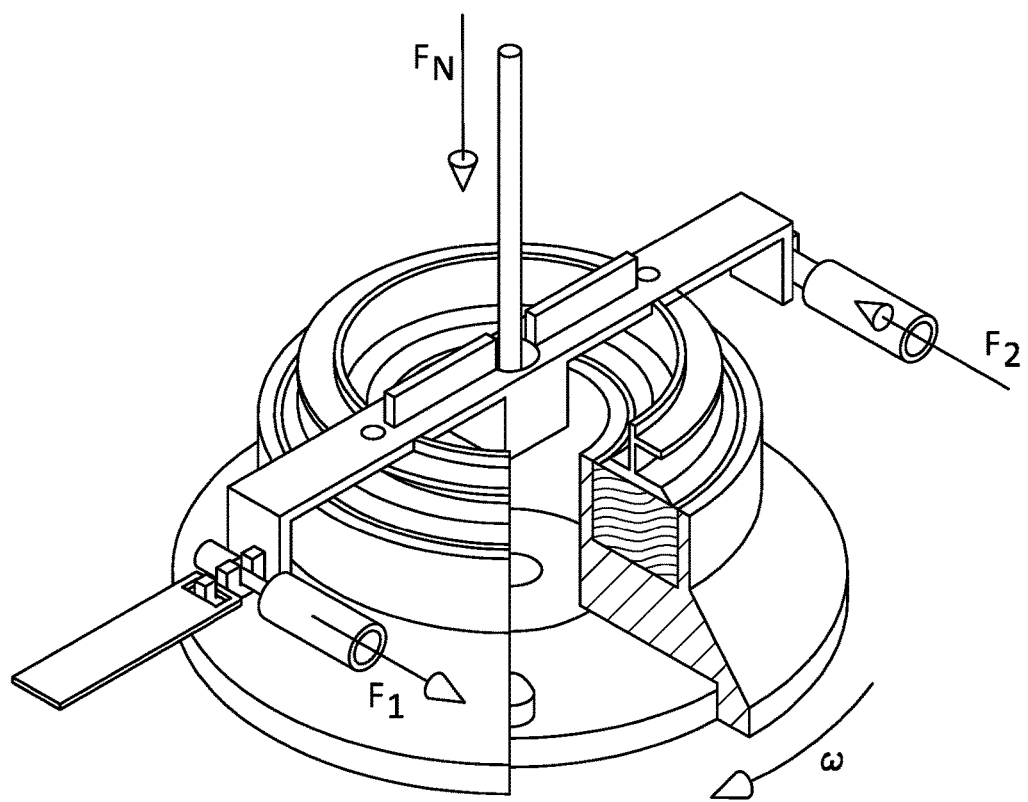
FIG. 2: The figure shows the principle of the measurement cell of the RST-XS ring shear tester, the operating principle of which is described in detail in Example 2 V2. ω: rotation of the measurement cell, $F_1$ and $F_2$: forces for holding back the cap of the measurement cell, $F_N$ normal force of the cap on the measurement cell.

V1: Treatment of $TiO_2$ Particles in Dry Phase

Starting material for the dry surface treatment of titanium dioxide was a $TiO_2$ in rutile modification with an inorganic modification of silicon oxide and aluminium oxide directly from the spray dryer discharge. This powder was mixed with the components specified in Table 1 annexed at the end of the description, in the quantities as specified, and was homogenised in a Lödige mixer for 60 seconds. The surface-treated $TiO_2$ was then ground dry in a steam jet mill with 18 bar steam. Alternatively, the grinding can be carried out by means of a pin mill, air jet mill, roller mill or ball tube mill. Tests were carried out in the following Examples 2-4 with the samples thus produced.

V2: Treatment of $TiO_2$ Particles in Wet Phase

Starting material for the wet surface treatment of $TiO_2$ with polyether siloxanes and phthalate-free plasticisers was a TiO2 filter cake after the inorganic modification, wherein the TiO2 was present in the rutile modification and the inorganic modification consisted of silicon dioxide and aluminium oxide. This filter cake was redispersed in water by means of dissolvers, and a polyether siloxane emulsion and phthalate-free plasticiser were added to the suspension. This obtained suspension was spray-dried, and then the spray core was ground dry with the aid of a steam jet mill with 18 bar steam.

V3: Treatment of $BaSO_4$ Particles in Dry Phase

Starting material for the dry surface treatment of barium sulphate with polyether siloxane and phthalate-free plasticisers was a wet-chemically precipitated barium sulphate (what is known as blanc fixe), which had not yet been ground dry, i.e. was steam jet ground for example. Polyether siloxane and phthalate-free plasticisers were added to this powder, and the mixture was homogenised in a Lödige mixer for 60 seconds. The $BaSO_4$ wetted with polyether siloxane and phthalate-free plasticiser was then ground dry in a steam jet mill with 10 bar steam. Alternatively, the grinding can be carried out by means of a pin mill, air jet mill, roller mill or ball tube mill.

V4: Treatment of ZnS Particles in Dry Phase

Starting material for the dry surface treatment of zinc sulphide with polyether siloxane was a wet-chemically precipitated zinc sulphide (what is known as sachtolith), which had not yet been ground dry, i.e. was steam jet ground for example. Polyether siloxane and phthalate-free plasticisers were added to this powder, and the mixture was homogenised in a Lödige mixer for 60 seconds. The ZnS wetted with polyether siloxane and phthalate-free plasticiser was then ground dry in a steam jet mill with 10 bar steam. Alternatively, the grinding can be carried out by means of a pin mill, air jet mill, roller mill or ball tube mill.

V5: Treatment of Lithopone Particles in Dry Phase

Starting material for the dry surface treatment of lithopone with polyether siloxane was lithopone that had been produced in a wet-chemical precipitation of $BaSO_4$ and ZnS and which had not yet been ground dry, i.e. was steam jet ground for example. Polyether siloxane and phthalate-free plasticisers were added to this powder, and the mixture was homogenised in a Lödige mixer for 60 seconds. The lithopone wetted with polyether siloxane and phthalate-free plasticiser was then ground dry in a steam jet mill with 10 bar steam. Alternatively, the grinding can be carried out by means of a pin mill, air jet mill, roller mill or ball tube mill.

Example 2: Determination of the Properties of the Surface-Treated Particles

V1: Dust Determination 100 g of the substance to be tested were weighed into the fall box (1). The fall box was locked using the lever (2) and suspended in the glass cylinder (3). The test tube (6) was filled with quartz wadding, weighed, and inserted into the glass cylinder (3). The end of the test tube (6) was closed via the gate (4). The other end was connected to a vacuum pump (8) by a vacuum tube via a washing flask (7) filled with quartz wadding. After 5 seconds the fall box (1) was unlocked. The pigment dropped into the glass cylinder and dust formed. After 10 sec the gate (4) was opened. After 20 seconds the vacuum pump was set in operation and exactly 20 l of air were sucked through the glass cylinder. The power of the vacuum pump was 10 l/min. Once the vacuum pump had been switched off, the previously weighed test tube was removed and weighed again. The weight difference was specified as the dust measurement. This determination was carried out twice. The average values of these measurements of the samples are specified in Table 1 (unit: mg/100 g of material).

V2: Powder Flowability

The powder flowability was determined using an RST-XS ring shear tester. The bulk material sample was filled into the measurement cell and loaded from above via a cap with a force (normal force) of 3.5 kPa. The shear cell rotated slowly (ω) during the measurement. The cap was prevented from rotating with the aid of two tie rods. The bulk material sample was subjected to shear deformation. The required force ($F_1$ and $F_2$) was measured. The flowability $ff_c$ of the bulk material was determined from the ratio of consolidation stress $\sigma_1$ to bulk material strength $\sigma_c$. The measurement results are presented in Table 1.

The greater is the flowability $ff_c$, the better the bulk material flows. The following ranges of different flowability were defined (D. Schulze, Pulver and Schüttgüter (Powder and Bulk Materials), Springer publishers, 2006, chapter 3.1.4, page 42):

$ff_c$ less than or equal to 1, not fluent, hardened
$ff_c$ of greater than 1 to equal to 2, very cohesive (to not fluent)
$ff_c$ of greater than 2 to equal to 4, cohesive
$ff_c$ of greater than 4 to equal to 10, slightly fluent
$ff_c$ greater than 10, freely fluent.

Example 3: Compositions

V1: Masterbatches

The compositions with thermoplastics are also referred to as masterbatches. These masterbatches can be produced in accordance with the following procedure.

A dry blend was first produced from the surface-treated pigments ($TiO_2$) to be tested and polyethylene as an example of a thermoplastic (LDPE: Lupole Purell 1800 SP 15) in a concentration of 50% by weight by weighing both components into a plastic flask and then mixing them for 15 min on a jar rolling mill. The resultant dry blend was then placed into a Brabender metering unit and fed via a screw conveyor to the Leistritz DS Extruder ZSE 18HP twin-screw extruder for processing. Processing to turn the blend into a masterbatch was performed at a rotational speed of 150 revolutions per minute (rpm) and a temperature setting of 150° C. in all zones. The polymer strand was granulated.

After this procedure, the compositions containing samples 1-5 according to Table 1 were produced.

V2: White Paste

White pastes were produced as an example for compositions.

90 g of dioctyl phthalate (DOP) were weighed into a 250 ml dissolver jar. Under light stirring, 167 g of the surface-treated particles were incorporated in portions using a 3 cm dissolver plate (approximately 5 m/sec) within 3 minutes. The dissolver was started up at 12500 rpm and dispersed for five minutes.

After this procedure, the compositions containing samples 1-5 according to Table 1 were produced.

Example 4: Testing of the Dispersibility of Surface-Treated Particles

V1: Testing of the Masterbatches in a Pressure Filter Test

The dispersibility was assessed in a pressure filter test on the basis of the rise in pressure before the filter created during the extrusion of a polymer melt via a screen pack.

The pressure filter value was determined using a Brabender Plasti-Corder LAB Station single-screw extruder (screw diameter/length: 30 mm/25D). A screen pack from the company FKD with a PZ-Microdur 14 (nominal filter fineness 14 μm) and a supporting fabric with a mesh size of 315 μm was used.

The extruder was heated to a temperature of 200° C. The temperature of the filter equipment was set to 230° C. Once the extruder had been thoroughly flushed with LDPE, the filter receptacle with the screen pack was installed. Once the $TiO_2$/LDPE masterbatch granulate to be tested had been fed and the pigmented material discharged at the bypass, the melt flow was guided via the screen pack and the computer-assisted acquisition of measurement data was started. The measurement data were recorded until a maximum pressure of 150 bar was reached, or, with a low rise in pressure, for a period of 60 minutes. The throughput was 40 g/min.

The measurement results are presented below in Table 1.

The measure for the dispersibility was the pressure filter value (DF), which is calculated in accordance with the following formula:

$$DF = \frac{(p_{max} - p_0) \times F \times 100}{(t \times K \times G)} [bar \times cm^2/g]$$

$p_{max}$: end pressure [bar]
$p_0$: starting pressure [bar]
F: filter area=6.16 $cm^2$
t: measurement time [min]
K: concentration [% by weight] of pigment in relation to the total composition
G: throughput [g/min]

The lower is the pressure filter value, the better is the dispersion of the pigment in the polymer. The samples according to the invention had good dispersibility.

V2: Testing of the Masterbatches in the Polymer Flat Films:

The dispersion behaviour of pigments in polymers was tested on the basis of the number of agglomerates in a flat film.

The masterbatches according to Example 3 (V1) were extruded in accordance with the following method to form films. The masterbatches were diluted with LDPE granulate (Purell PE 3020H) to a concentration of 10% by weight pigment ($TiO_2$). The masterbatch and polymer granulate were placed for this purpose in a plastic flask and shaken by hand for ½ minute. The sample was then extruded on a Brabender Plast-Corder LAB Station single-strew extruder (screw diameter/length: 30 mm/25D) at 15 rpm and at a temperature of 190° C. A film approximately 8 cm wide was discharged via a flat film die. The film strand was drawn over a belt conveyor, cooled, and rolled up.

5 pieces approximately 50 cm long from the film strand were inspected. The assessment was performed under transmitted light with regard to the number of undispersed agglomerates at two different magnifications (0 times: no magnification; 30 times: at thirty times magnification). Here, the size of the specks, which consist of incompletely dispersed agglomerates, had no influence on the scoring.

The results were scored in a five-tier system, in which score 1 means no specks, score 2 means isolated specks (there were test areas having 1 to 2 specks, but also test areas with no specks), score 3 means moderate number of specks (all test areas had specks, on average these were present in an amount of less than 5 per test area), score 4 means a lot of specks (all test areas have 5 to 10 specks), and score 5 means a very high number of specks (all test areas have at least 10 specks on average).

The values in Table 1 below are given as scores counted from 5 test areas. From score 3 the masterbatches are unsuitable for the production of films. The samples according to the invention had good dispersibility.

V3: Testing in Plasticisers

The granularity of pigments in a white paste under defined dispersion conditions was determined. For this purpose, 3 g of the produced white pastes according to Example 3 (V2) were stirred well in a plastic beaker with the same amount of DOP using a spatula. To determine the fineness the diluted paste was first placed on a Hegman gauge (grindometer), more specifically on a 0 to 100 μm Hegman gauge, and then the correspondingly fine samples were placed on a 0 to 25 μm Hegman gauge (Erichsen). The visually determined fineness values were noted in μm and are presented in Table 1 below. A fineness of more than 20 μm indicates poor dispersion.

TABLE 1

| Sample | Polyether siloxane according to formula I (x) or not according to formula I (o) | Plasticiser | Food approval (Indirect Food Contact pursuant to EU 10/2011) | Dust mass mg/100 g (Example 2) | Pressure filter value [bar * cm²/g] (Example 4 V.1) | PE film score (Example 4 v.2) without magnification | PE film score (Example 4 v.2) with 30x magnification | Fineness [μm] | ffc values with RST-XS ring shear tester |
|---|---|---|---|---|---|---|---|---|---|
| 1 | x (0.45%) | without plasticiser | yes | 40 | 0.9 | 1- | 1-2 | 1.5 | 1.5 |
| 2 | x (0.45%) | 0.2% Hexamoll DINCH (BASF) | yes | 8 | 1.09 | 1-2 | 1-2 | 2.2 | 2.2 |
| 3 | o (0.45%) | without plasticiser | no | 37 | 0.9 | 1 | 1-2 | 1.4 | 1.4 |
| 4 | o (0.45%) | 0.2% Hexamoll DINCH (BASF) | no | 8 | 2.5 | 2 | 2-3 | 1.8 | 1.8 |
| 5 | without polyether siloxane | 0.3% Mesamoll TP LXS 51067 (Lanxess) | yes | 8 | 18.5 | 3 | 3-4 | 1.3 | 1.3 |

Under consideration of the measured values in Table 1, it can be determined that only the particles according to the invention and the corresponding compositions have good results in the measurement results of the example tests. None of the comparison particles or comparison compositions according to samples 1, 3, 4 or 5 can attain such good measured values in terms of the dust mass, the pressure filter value, the PE film score, or the fineness in plasticiser paste. The particles according to the invention are approved for indirect food contact pursuant to EU 10/2011 and have a low dust value and good dispersibility.

The invention claimed is:

1. Particles comprising:
$TiO_2$, $BaSO_4$, $ZnS$ or lithopone with a coating comprising at least one compound of formula (I)

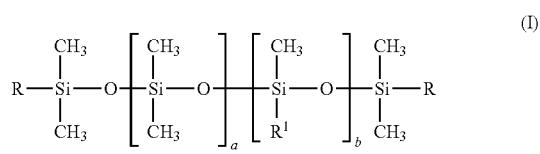

(I)

in which
R is methyl,
$R^1$ is a polyether group of formula (II):

(II), in which
Z is equal to an unbranched alkylene group having 2 to 4 carbon atoms,
m is 2 to 4
n is 1 to 3,
o is 0,
$EO_x$, $PO_y$, $BO_z$ is an oxyalkylene group, containing oxyethylene (EO), oxypropylene (PO) and/or oxybutylene (BO) units, wherein x is 3 to 5, y is 10 to 25 and z is 0,
$R^3$ is hydrogen,
and with the provision that in $R^1$ the sum of carbon and oxygen atoms is at least 70,
a is 80 to 95,
b is 5 to 8, and
comprising at least one phthalate-free plasticiser,
wherein the at least one compound of formula (I) is present with a proportion of from 0.01 to 2% by weight, and at least one phthalate-free plasticiser is present with a proportion of from 0.01 to 4.0% by weight, wherein the values in % by weight relate to the weight of the used dried primary particles,
wherein the at least one phthalate-free plasticiser comprises:
esters of aliphatic hydrocarbons having 6 to 21 carbon atoms with at least one acid group selected from the group consisting of a carboxyl group, a sulfonyl group, and a sulfinyl group, with a monovalent or polyvalent aliphatic alcohol having 6 to 20 carbon atoms or a monovalent or bivalent aromatic alcohol, or
esters of aromatic 1,4-(para)dicarboxylic acids or aromatic tricarboxylic acids with a monovalent or polyvalent aliphatic alcohol having 6 to 20 carbon atoms.

2. The particles according to claim 1, wherein the numerical ratio of index a to index b in formula (I) is equal to 8 to 18.

3. The particles according to claim 1, wherein the index x is between 0.05 and 1.2 times the sum of indices y+z.

4. The particles according to claim 1, wherein the particles are $TiO_2$.

5. The particles according to claim 1, having a dust value of at most 30 mg per 100 g of surface-treated particles.

6. A method for producing surface-treated particles comprising TiO$_2$, BaSO$_4$, ZnS or lithopone according to claim 1, wherein primary particles from TiO$_2$, BaSO$_4$, ZnS or lithopone are brought into contact, simultaneously or in succession, with the at least one compound of formula (I)

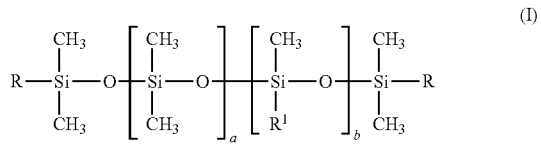

and with the at least one phthalate-free plasticiser or mixtures thereof, wherein the at least one compound of formula (I) is present with a proportion of from 0.01 to 2% by weight, wherein the at least one phthalate-free plasticiser is present with a proportion of from 0.01 to 4.0% by weight, and wherein the values in % by weight relate to the weight of the used dried primary particles.

7. Particles from TiO$_2$, BaSO$_4$, ZnS or lithopone, obtainable by the method according to claim 6.

8. A composition comprising a polymer and/or a plasticiser having particles according to claim 1.

9. The composition according to claim 8, wherein the polymer is a thermoset or thermoplastic.

10. The composition according to claim 8, wherein the composition is a masterbatch, a plastic moulded article, or a plastic film.

11. The particles according to claim 1, wherein the at least one phthalate-free plasticiser does not include any 1,2-phthalate acid esters.

12. The particles according to claim 1, wherein the at least one phthalate-free plasticiser comprises an ester of an aliphatic hydrocarbon having 6 to 21 carbon atoms with at least one acid group selected from the group consisting of a carboxyl group, a sulfonyl group, and a sulfinyl group, with a monovalent or bivalent aromatic alcohol.

13. The particles according to claim 1, wherein the at least one phthalate-free plasticiser comprises 1,2-cyclohexanedicarboxylic acid diisononyl ester; alkanesulfonic acid phenyl ester; alkanesulfonic acid diphenyl ester; bis(2-ethylhexyl-) 1,4-benzene dicarboxylate; triethylene glycol bis(2-ethylhexanoate); or trioctyl trimellitate.

14. The particles according to claim 1, comprising BaSO$_4$ or ZnS.

15. The particles according to claim 1, comprising lithopone.

* * * * *